(12) United States Patent
Ahn

(10) Patent No.: US 12,548,815 B2
(45) Date of Patent: Feb. 10, 2026

(54) BATTERY MODULE

(71) Applicant: LG Energy Solution, Ltd., Seoul (KR)

(72) Inventor: Moon-Youl Ahn, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 861 days.

(21) Appl. No.: 17/428,154

(22) PCT Filed: Nov. 18, 2020

(86) PCT No.: PCT/KR2020/016265
§ 371 (c)(1),
(2) Date: Aug. 3, 2021

(87) PCT Pub. No.: WO2021/149903
PCT Pub. Date: Jul. 29, 2021

(65) Prior Publication Data
US 2022/0093986 A1    Mar. 24, 2022

(30) Foreign Application Priority Data

Jan. 22, 2020   (KR) ........................ 10-2020-0008779

(51) Int. Cl.
*H01M 10/613*   (2014.01)
*H01M 10/625*   (2014.01)
(Continued)

(52) U.S. Cl.
CPC ....... *H01M 10/613* (2015.04); *H01M 10/625* (2015.04); *H01M 10/647* (2015.04);
(Continued)

(58) Field of Classification Search
CPC .......................... H01M 10/613; H01M 10/653
See application file for complete search history.

(56) References Cited

U.S. PATENT DOCUMENTS

2016/0087319 A1   3/2016   Roh et al.
2018/0019508 A1   1/2018   Lee et al.
(Continued)

FOREIGN PATENT DOCUMENTS

CN   104981937 A   10/2015
CN   106025423 A   10/2016
(Continued)

OTHER PUBLICATIONS

JP2019125665A Translation from Espacenet (Year: 2019).*
(Continued)

*Primary Examiner* — Nathanael T Zemui
(74) *Attorney, Agent, or Firm* — Lerner David LLP

(57) ABSTRACT

A battery module includes a cell stack having a plurality of secondary batteries arranged along one direction; a module housing configured to accommodate the cell stack therein; a thermal conductive adhesive provided in a space between a lower end of the cell stack and a bottom surface of the module housing; and a heat dissipation foam having a foam structure with a predetermined volume and a heat dissipation sheet configured to surround the foam. The heat dissipation foam is disposed in the space between the lower end of the cell stack and the bottom surface of the module housing so as to be surrounded by the thermal conductive adhesive.

17 Claims, 6 Drawing Sheets

(51) Int. Cl.
  *H01M 10/647* (2014.01)
  *H01M 10/653* (2014.01)
  *H01M 10/6554* (2014.01)
  *H01M 50/211* (2021.01)

(52) U.S. Cl.
  CPC ..... *H01M 10/653* (2015.04); *H01M 10/6554* (2015.04); *H01M 50/211* (2021.01); *H01M 2220/20* (2013.01)

(56) References Cited

U.S. PATENT DOCUMENTS

| | | | | |
|---|---|---|---|---|
| 2018/0366794 | A1* | 12/2018 | Kim | H01M 10/6551 |
| 2018/0366795 | A1* | 12/2018 | Chi | H01M 10/6554 |
| 2019/0148802 | A1 | 5/2019 | Lim et al. | |
| 2019/0221904 | A1 | 7/2019 | Fujii | |
| 2019/0221905 | A1 | 7/2019 | Shimizu | |
| 2019/0280265 | A1* | 9/2019 | Jansen | H01M 50/293 |
| 2020/0044227 | A1 | 2/2020 | Ryu et al. | |
| 2020/0161727 | A1* | 5/2020 | Phlegm | B60K 1/00 |
| 2020/0313253 | A1 | 10/2020 | Ahn | |
| 2022/0238940 | A1* | 7/2022 | Wang | H01M 10/613 |

FOREIGN PATENT DOCUMENTS

| | | |
|---|---|---|
| CN | 108475830 A | 8/2018 |
| CN | 108735936 A | 11/2018 |
| CN | 209709040 U | 11/2019 |
| JP | 2010021230 A | 1/2010 |
| JP | 2012174972 A | 9/2012 |
| JP | 2013161559 A | 8/2013 |
| JP | 2013231166 A | 11/2013 |
| JP | 201996410 A | 6/2019 |
| JP | 2019125449 A | 7/2019 |
| JP | 2019125665 A | 7/2019 |
| KR | 20170107800 A | 9/2017 |
| KR | 20180023633 A | 3/2018 |
| KR | 20180023699 A | 3/2018 |
| KR | 20180112630 A | 10/2018 |
| KR | 20190054300 A | 5/2019 |
| KR | 20190105731 A | 9/2019 |
| KR | 20190107397 A | 9/2019 |
| KR | 20200004202 A | 1/2020 |
| WO | 2013115312 A1 | 8/2013 |
| WO | 2018206896 A1 | 11/2018 |

OTHER PUBLICATIONS

International Search Report for Application No. PCT/KR2020/016265, dated Mar. 2, 2021, 3 pages.

Search Report dated Jan. 16, 2023 from the Office Action for Chinese Application No. 202080037104.3, issued Jan. 20, 2023, pp. 1-3. [See p. 1, categorizing the cited references].

* cited by examiner

BATTERY MODULE

CROSS-REFERENCE TO RELATED APPLICATIONS

The present application is a national phase entry under 35 U.S.C. § 371 of International Application No. PCT/KR2020/016265 filed on Nov. 18, 2020, which claims priority from Korean Patent Application No. 10-2020-0008779 filed on Jan. 22, 2020, all of which are incorporated herein by reference.

TECHNICAL FIELD

The present disclosure relates to a battery module including a plurality of secondary batteries, and more particularly, to a battery module having a simple structure for fixing secondary batteries and securing effective cooling performance with a light weight.

BACKGROUND ART

Recently, secondary batteries are attracting attention as power sources of electric vehicles (EV), hybrid electric vehicles (HEVs), and the like, which are proposed as a solution to air pollution of gasoline vehicles, diesel vehicles, and the like using fossil fuels.

One secondary battery cell or two to four secondary battery cells are used in a small mobile device, but medium and large devices such as electric vehicles require high power and large capacity and thus use a battery module in which a plurality of secondary battery cells are electrically connected to each other, or a battery pack in which a plurality of battery modules are electrically connected to each other.

For example, the battery module may include a cell assembly formed by aggregating secondary battery cells, a bus bar (or, a metal plate) for connecting the secondary battery cells in series and/or in parallel, a sensing assembly for sensing voltage and temperature, electric equipment for controlling charging and discharging, and a module housing for accommodating the above components.

One of the most popular secondary batteries among the currently commercialized secondary batteries may be a lithium secondary battery. The lithium secondary battery may be classified into can-type and pouch-type depending on the shape of an exterior. Among them, the pouch-type secondary batteries are widely used in middle and large battery modules due to high energy density and easy stacking.

Meanwhile, if the secondary battery is heated over an appropriate temperature, its performance may be deteriorated, and in severe cases, explosion or ignition may occur. In particular, if the battery module is configured by stacking a plurality of pouch-type secondary batteries, heat emitting from the plurality of secondary batteries in a narrow space may be added up, so that the temperature of the battery module may increase faster and more severely. Therefore, if the battery module is configured using a plurality of secondary batteries, it is very important to provide a cooling means to eliminate heat generation.

FIG. 1 is a diagram schematically showing a cooling configuration of a conventional battery module.

Referring to FIG. 1, the conventional battery module includes a TIM (Thermal Interface Material) 3 between secondary battery cells 1 and a bottom surface of a module housing 2. The TIM 3 employs a thermal conductive resin with adhesion to fix the secondary battery cells and transfer heat of the secondary battery cells at the same time. Although not shown, a heatsink may be disposed on an outer surface of a bottom of the module housing 2. In this case, the heat of the secondary battery cells 1 may be effectively transferred to the bottom of the module housing 2 via the TIM 3, and the heat of the module housing 2 may be cooled by the heatsink.

In the conventional battery module, the TIM must be filled in the entire space between the lower end of the secondary battery cells and the bottom surface of the module housing in order to stably secure the heat transfer performance while fixing the secondary battery cells. However, since the amount of TIM required at this time is not small, the weight of the battery module increases. Therefore, in order to reduce the weight of the battery module, it is necessary to reduce the amount of the TIM. However, if the amount of the TIM is recklessly reduced, it is obvious that the fixability and the heat transfer rate of the secondary battery cells will be lower than before. Therefore, there is demanded a solution therefor.

DISCLOSURE

Technical Problem

The present disclosure is designed to solve the problems of the related art, and therefore the present disclosure is directed to providing a battery module, which may sufficiently secure fixability and heat transfer performance of secondary battery cells while using a smaller amount of TIM such as a thermal conductive resin compared to the existing technique.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a cell stack having a plurality of secondary batteries arranged along one direction; a module housing configured to accommodate the cell stack therein; a thermal conductive adhesive provided in a space between a lower end of the cell stack and a bottom surface of the module housing; and a heat dissipation foam having a foam with a predetermined volume and a heat dissipation sheet configured to surround the foam, the heat dissipation foam being disposed in the space to be mixed with the thermal conductive adhesive.

The heat dissipation sheet may be made of a graphite material.

The module housing may include a bottom plate made of a thermal conductive material and configured to form the bottom surface of the module housing; a pair of side plates configured to cover left and right surfaces of the cell stack; and a top plate configured to cover an upper end of the cell stack.

The thermal conductive adhesive may be applied to at least a location higher than an upper surface of the heat dissipation foam.

The heat dissipation foam may have a hexahedral shape or a roll shape, and a plurality of the heat dissipation foams may be provided so that the plurality of the heat dissipation foams are arranged in a matrix on the bottom plate with a predetermined interval from each other.

The heat dissipation foam may have a length extending as much as a length of a lateral width of the bottom plate, and a plurality of the heat dissipation foams may be provided so that the plurality of the heat dissipation foams are arranged in a front and rear direction with a predetermined interval from each other.

The heat dissipation foam may be disposed so that a lower surface thereof is in contact with a surface of the bottom plate, and the cell stack may be disposed so that at least a part of the lower end thereof is in contact with an upper surface of the heat dissipation foam to perform heat transfer and buffering.

The battery module may further comprise fence members respectively located inwardly of both longitudinal ends of the bottom plate by a predetermined distance and configured to form walls with a predetermined height from a surface of the bottom plate to confine the thermal conductive adhesive in a predetermined area.

The battery module may further comprise a heatsink disposed in contact with a lower portion of the bottom plate to absorb heat of the bottom plate.

The foam may be made of a polyurethane material.

The secondary batteries may be provided to be erected in an upper and lower direction and to be in close contact with each other in a left and right direction.

The secondary batteries may be pouch-type secondary batteries or rectangular secondary batteries.

In another aspect of the present disclosure, there is also provided a battery pack, comprising at least one battery module described above.

In still another aspect of the present disclosure, there is also provided an electric vehicle, comprising at least one battery module described above.

Advantageous Effects

According to an embodiment of the present disclosure, it is possible to significantly reduce the amount of thermal conductive resin relatively compared to a conventional battery module that uses a thermal conductive resin, in order to fix secondary battery cells and transfer heat thereof.

That is, the battery module according to the present disclosure may be lighter than the conventional battery module by reducing the amount of the thermal conductive resin and mixing a lighter heat dissipation foam with the thermal conductive resin instead.

According to another embodiment of the present disclosure, the stability and cooling of the secondary battery cells may be further improved since the heat dissipation foams perform buffering and heat transfer functions.

According to still another embodiment of the present disclosure, since the fence member is provided, while a thermal conductive resin is being applied and the cell stack is being placed on the bottom plate, the cell stack may be disposed on the bottom plate accurately and easily while preventing the thermal conductive resin from overflowing outside the area of the bottom plate.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustration only, not intended to limit the scope of the disclosure, so it should be understood that other equivalents and modifications could be made thereto without departing from the scope of the disclosure.

Figure 1:
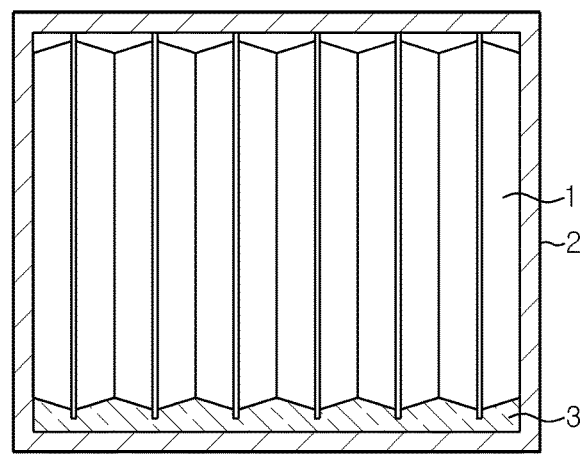
FIG. 1 is a diagram schematically showing a cooling structure of a conventional battery module.
Figure 2:
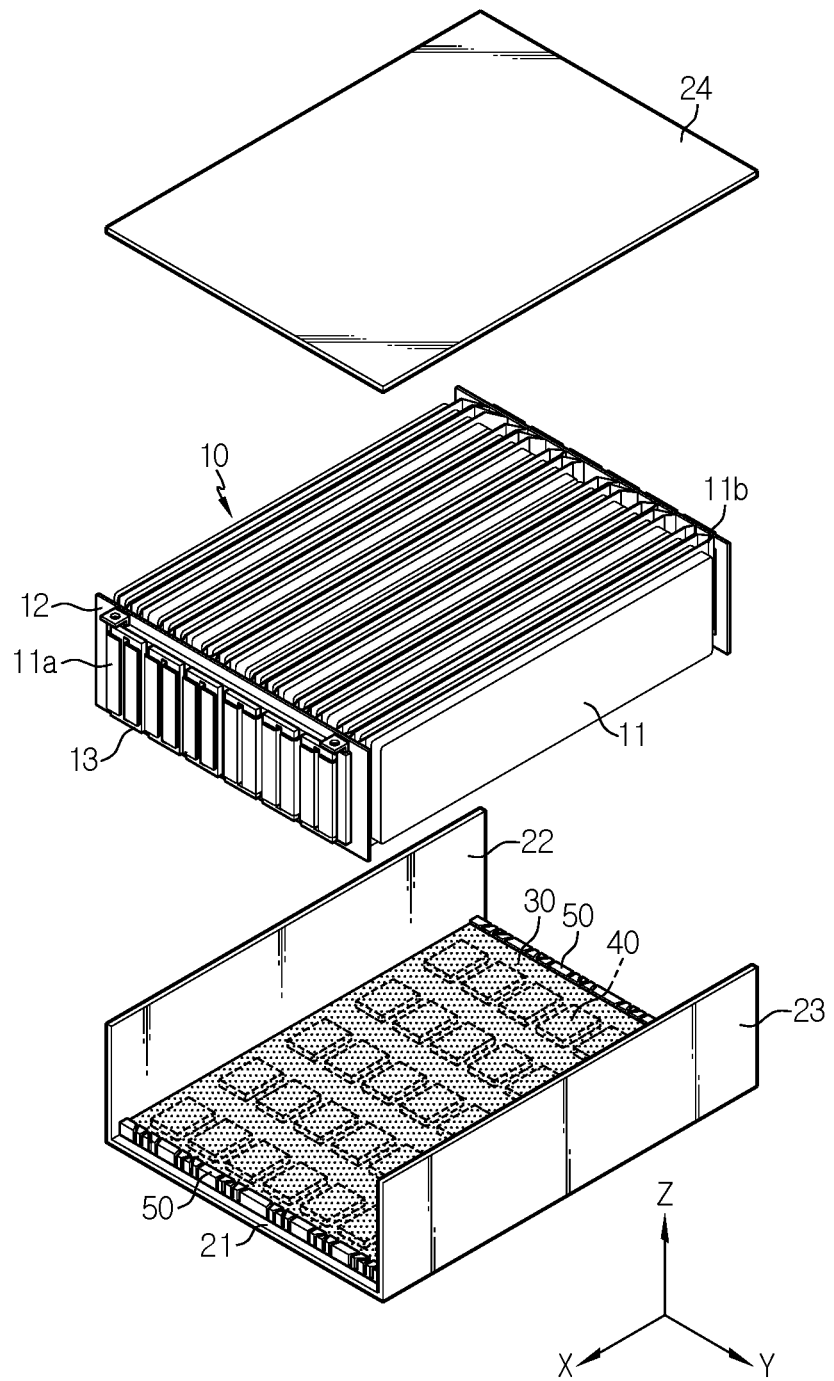
FIG. 2 is an exploded perspective view schematically showing a main configuration of a battery module according to an embodiment of the present disclosure.
Figure 3:
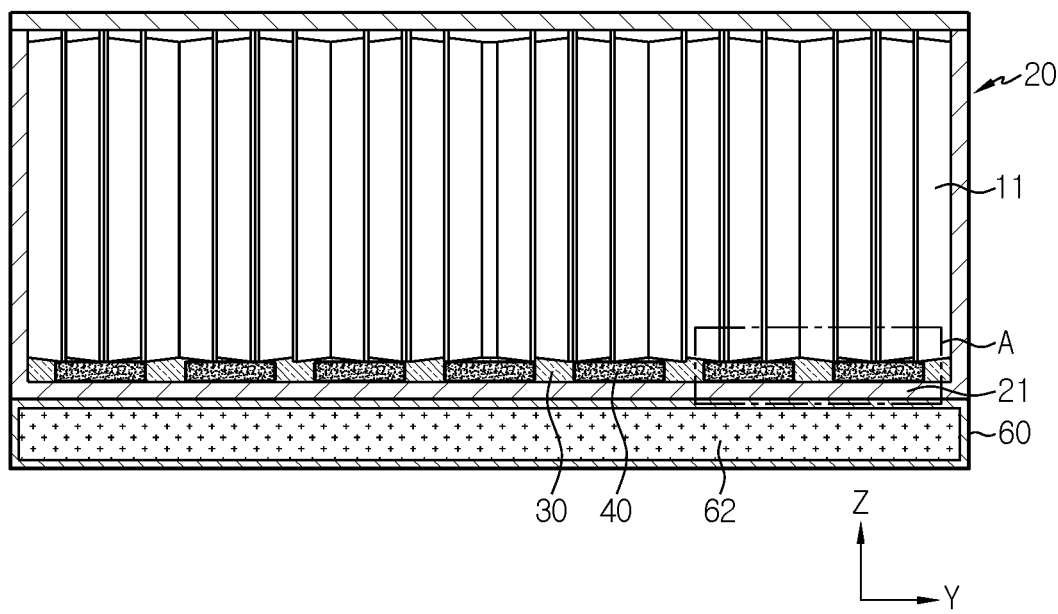
FIG. 3 is a sectional view showing the battery module according to an embodiment of the present disclosure.

FIG. 2 is an exploded perspective view schematically showing a main configuration of a battery module according to an embodiment of the present disclosure, and FIG. 3 is a sectional view showing the battery module according to an embodiment of the present disclosure.

Referring to these drawings, the battery module according to the present disclosure may include a cell stack 10, a module housing 20, a thermal conductive adhesive 30, and a heat dissipation foam 40.

The cell stack 10 may include a plurality of secondary batteries arranged along one direction. The secondary battery may employ a pouch-type secondary battery, a rectangular secondary battery, or a cylindrical secondary battery.

The battery module according to this embodiment includes the cell stack formed using pouch-type secondary batteries. As shown in the drawings, the pouch-type secondary batteries are erected in an upper and lower direction (±Z axis) and arranged to be in close contact with each other in a left and right direction (±Y) to form the cell stack.

The pouch-type secondary battery 11 may include an electrode assembly, an electrolyte, and a pouch exterior for packaging them. Here, the electrode assembly includes at least one positive electrode plate and at least one negative electrode plate with a separator being interposed therebetween. Such an electrode assembly is widely known in the art and thus will not be described in detail here.

The pouch exterior may be configured to include an outer insulation layer, a metal layer and an inner adhesive layer. In particular, the pouch exterior may be configured to include a metal thin film, for example an aluminum foil, in order to protect internal components such as the electrode assembly and the electrolyte, supplement the electrochemical properties by the electrode assembly and the electrolyte, and improve heat dissipation. The aluminum foil may be interposed between the insulation layer formed of an insulating material and the inner adhesive layer in order to secure electrical insulation from components inside the secondary battery 11 such as the electrode assembly and the electrolyte or from other components outside the secondary battery 11.

In addition, the pouch exterior may include a left pouch sheet and a right pouch sheet, and at least one of the left pouch sheet and right pouch sheet may be configured to have a concave accommodation portion. In addition, the electrode assembly may be accommodated in the accommodation portion of the pouch. A sealing portion may be provided at outer circumferential surfaces of the left pouch sheet and the right pouch sheet, and the inner adhesive layers of the sealing portions may be thermally fused to each other to seal the accommodation portion in which the electrode assembly is accommodated.

Meanwhile, an electrode tab is provided to each electrode plate of the electrode assembly, and at least one electrode tab may be connected to an electrode lead 11a. In addition, the electrode lead 11a may be interposed between the sealing portions of the left pouch sheet and the right pouch sheet and exposed out of the pouch exterior to function as an electrode terminal of the secondary battery 11.

As shown in FIG. 2, a bus bar frame 12 may be mounted to front and rear sides of the cell stack 10. The bus bar frame 12 may include a plurality of bus bars 13 provided in a predetermined pattern in the form of a metal plate. For example, all secondary batteries 11 of the cell stack 10 may be connected in series and/or parallel by overlapping and welding positive electrode leads of two or more secondary batteries 11 to one side of the bus bar 13 and overlapping and welding negative electrode leads of two or more secondary batteries 11 to the other side of the same bus bar 13.

The module housing 20 is a structure that accommodates the cell stack 10 therein and protects the cell stack 10 from external impacts, and may be made of a metal material with high mechanical rigidity. Of course, the module housing 20 does not have to be limited to the metal material. For example, the module housing 20 may be made of a non-metallic material to ensure insulation.

Specifically, the module housing 20 according to this embodiment may include a bottom plate 21, a pair of side plates 22, 23, and a top plate 24.

The bottom plate 21 forms a bottom surface of the module housing 20, and may be provided in the form of a plate-shaped body having a relatively large area that may support the entire lower end of the cell stack 10. In particular, the bottom plate 21 is preferably made of a material having excellent thermal conductivity so that heat conducted from the cell stack 10 may be easily dissipated to the outside of the module housing 20.

The pair of side plates 22, 23 may be provided to cover left and right surfaces of the cell stack 10. In this embodiment, the bottom plate 21 and the pair of side plates 22, 23 are integrally manufactured in the form of an approximately "U-shaped" to "⊂-shaped" frame. The cell stack 10 is placed in the inner space of the approximately U-shaped frame, and the cell stack 10 may be pressed by the side plates 22, 23.

In other words, in this embodiment, when the cell stack 10 is placed on the bottom plate 21, the module housing 20 is configured so that wide side surfaces of the secondary batteries 11 located at both outermost sides of the cell stack 10 make a face contact with the side plates 22, 23 and receive a predetermined pressure. By doing so, it is possible to improve the fixability and the heat transfer rate of the cell stack 10 and to alleviate the expansion of the secondary batteries 11 during charging and discharging.

The top plate 24 is a plate-shaped body provided to cover an upper end of the cell stack 10 and may be coupled to upper ends of the side plates 22, 23. For example, the top plate 24 may be provided to be connected to the side plates 22, 23 by hooking, bolting, welding, press fitting, or the like.

The module housing 20 of this embodiment may be considered to briefly include the "U-shaped" frame and the top plate 24. However, unlike this embodiment, the module housing 20 may also be manufactured in a square tube shape or by coupling four plate bodies by hooking, bolting, welding, press fitting, or the like.

The thermal conductive adhesive 30 is a component that fixes the cell stack 10 in the module housing 20 and allows heat of each of the pouch-type secondary batteries 11 to be easily transferred to the module housing 20.

Specifically, referring to FIG. 3, the thermal conductive adhesive 30 may be interposed in a space between the lower end of the cell stack 10 and the bottom surface of the module housing 20, namely between an lower edge of each of the pouch-type secondary batteries 11 and an upper surface of the bottom plate 21.

In this embodiment, the thermal conductive adhesive 30 is applied onto the upper surface of the bottom plate 21, and the cell stack 10 is placed thereon so that the thermal conductive adhesive 30 may be provided in the space.

However, unlike this embodiment, it is also possible to place the cell stack 10 on the upper surface of the bottom plate 21 first and then fill the thermal conductive adhesive 30 into the module housing 20. In this case, the bottom plate 21 may have small injection holes, and the thermal conductive adhesive 30 may be injected into the module housing 20 through the injection holes to evenly spread onto the upper surface of the bottom plate 21.

By using the thermal conductive adhesive 30 in this way, the cell stack 10 and the bottom plate 21 may be bonded and fixed to each other in a simple way. In addition, since the thermal conductive adhesive 30 is filled in the space between the lower edge of all pouch-type secondary batteries 11 of the cell stack 10 and the bottom plate 21 to eliminate the air layer, heat of the secondary batteries 11 may be quickly transferred to the bottom plate 21.

The thermal conductive adhesive 30 may employ various organic and/or inorganic resins such as a thermal conductive epoxy adhesive, a thermal conductive silicone adhesive, and a thermal conductive urethane adhesive. Since the thermal conductive resin has higher thermal conductivity than general adhesives, it is possible to further increase the heat transfer amount and the heat transfer rate between the pouch-type secondary battery 11 and the bottom plate 21.

Meanwhile, the battery module according to the present disclosure further includes one or more heat dissipation foams 40 interposed in the space between the lower end of the cell stack 10 and the bottom surface of the module housing 20.

The heat dissipation foams 40 may be disposed on the upper surface of the bottom plate 21 to be mixed with the thermal conductive adhesive 30 in the space. As explained later, according to the present disclosure, it is possible to provide a battery module that is lighter than other conventional battery modules using the thermal conductive adhesive 30.

Figure 4:
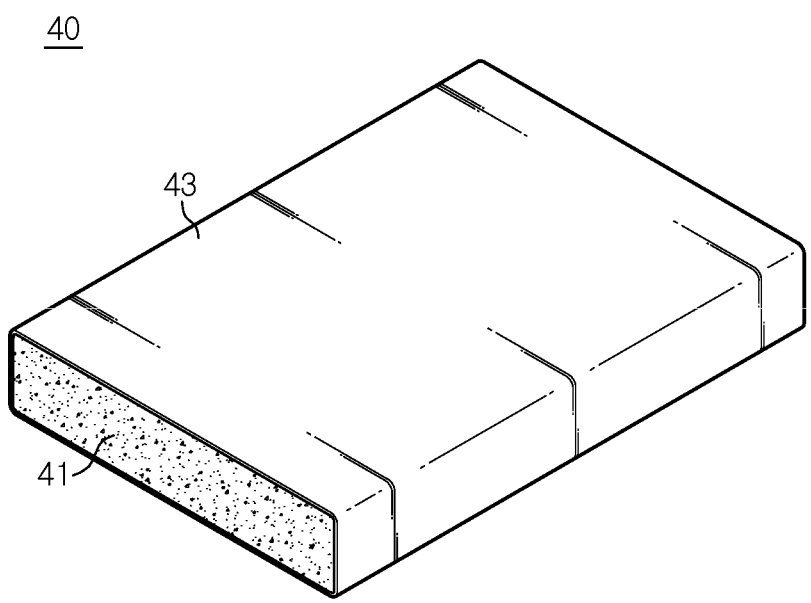
FIG. 4 is a perspective view showing a heat dissipation foam of FIG. 3.

Specifically, the heat dissipation foam 40 may include a sponge or foam 41 having compressibility and restorability, and a heat dissipation sheet 43 configured to surround an outer circumference of the foam 41, as shown in FIG. 4.

The foam 41 may be made of a polyurethane material with compressibility, restorability, and heat resistance. The heat dissipation foam 40 of the present disclosure uses this foam 41 as a core, so it is lightweight and may not impact the heat source.

In addition, the heat dissipation foam 40 may stably support the lower end of the cell stack 10 because the foam 41 is formed in a hexahedral shape. However, the foam 41 may be manufactured in various shapes and sizes depending on its application location and surrounding conditions. For example, the foam 41 may be implemented in various shapes and sizes, such as a roll shape, a step shape and a bent shape.

The heat dissipation sheet 43 may be made of aluminum, copper, silver, graphite, or the like having excellent thermal conductivity. Among these materials, this embodiment employs graphite as the material of the heat dissipation sheet 43.

Graphite is a type of carbon. Carbon is produced at high temperature, and graphite is obtained by burning this carbon once more at high temperature (2,000 to 3,000° C.). Because graphite is produced at higher temperatures than ordinary carbon, graphite is resistant to heat and has excellent elasticity. In addition, graphite is lighter and slimmer than aluminum, copper and silver, and also has excellent characteristics in dissipating heat from the inside.

In particular, even though an existing sheet or pad for heat conduction (aluminum, silicon material) has a heat dissipation effect just in a longitudinal direction, namely in a thickness direction, the heat dissipation sheet 43 made of a graphite material has a very excellent heat dissipation effect even in a transverse direction, namely in a surface direction. Therefore, graphite may be effective in reducing the temperature of the heating source by spreading the heat of the heating source widely in a short time.

Since the heat dissipation foam 40 is configured so that the hexahedral foam 41 is surrounded by the heat dissipation sheet 43 made of graphite, the heat dissipation foam 40 may be interposed to give volume in the space between the heat source and the metal plate capable of absorbing heat from the heat source, namely in the space between the lower end of the cell stack 10 and the bottom plate 21, and may also effectively transfer heat of the secondary batteries 11 to the bottom plate 21. At this time, since the heat dissipation foam 40 has elasticity as described above, even if the heat dissipation foam 40 is disposed between the lower end of the cell stack 10 and the bottom plate 21, the heat dissipation foam 40 does not apply an excessive pressure to the secondary batteries 11 or the bottom plate 21, thereby causing no deformation of an object in contact therewith Therefore, the battery module of the present disclosure may reduce the amount of the thermal conductive adhesive 30 as much as the volume of the heat dissipation foams 40, thereby reducing its weight.

Hereinafter, an application example of the thermal conductive adhesive 30 and the heat dissipation foam 40 will be described in more detail with reference to FIGS. 5 to 8.

Figure 5:
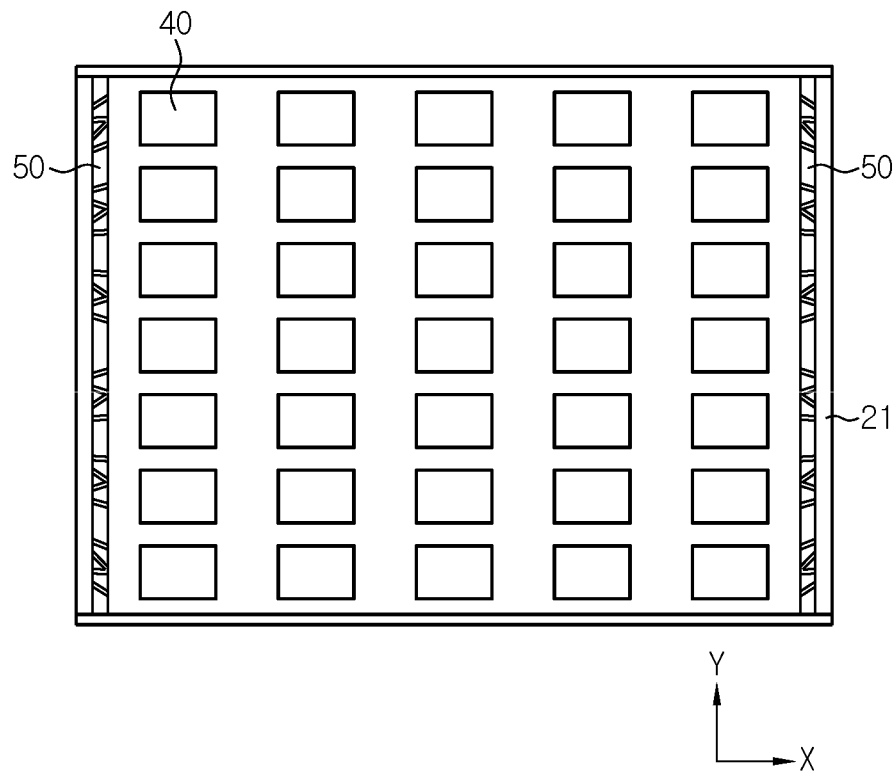
FIG. 5 is a diagram showing heat dissipation foams disposed on a bottom plate according to an embodiment of the present disclosure.

The heat dissipation foams 40 may be arranged on the bottom plate 21 to be spaced apart from each other in the horizontal (X-axis) and vertical (Y-axis) directions with a predetermined distance from each other, as shown in FIG. 5. In other words, the heat dissipation foams 40 may be arranged in a (5×7) matrix on the bottom plate 21. At this time, it is preferred to bond the heat dissipation foams 40 to the surface of the bottom plate 21 so that the matrix is not in disorder.

Although not shown, it may be a good alternative that a groove corresponding to the size of the heat dissipation foam 40 is provided at each predetermined location on the bottom plate 21 and the heat dissipation foam 40 is interposed and fixed in the groove. In this case, the heat dissipation foams 40 may be aligned more accurately and quickly on the bottom plate 21.

Figure 6:
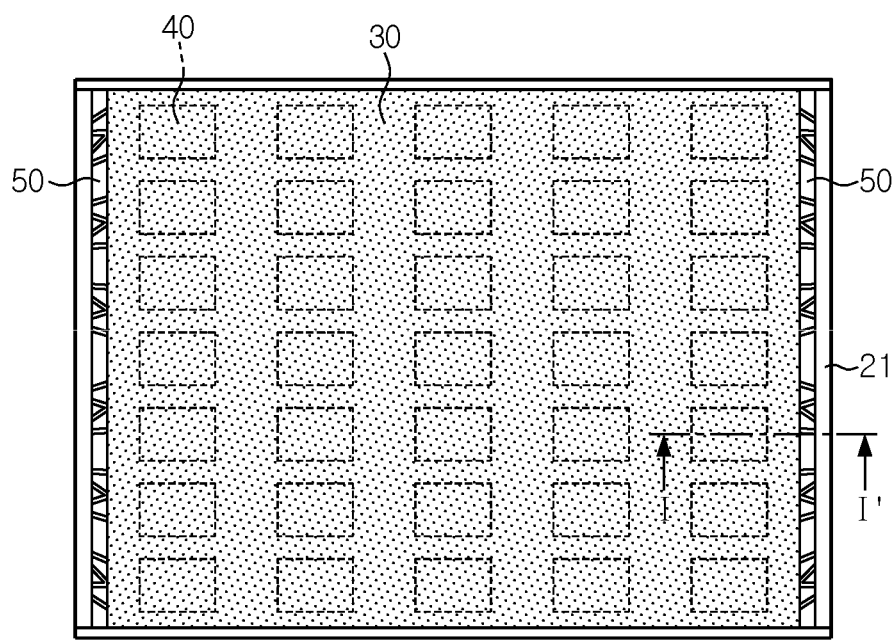
FIG. 6 is a diagram showing a state where a thermal conductive adhesive is applied to the bottom plate of FIG. 5.
Figure 7:
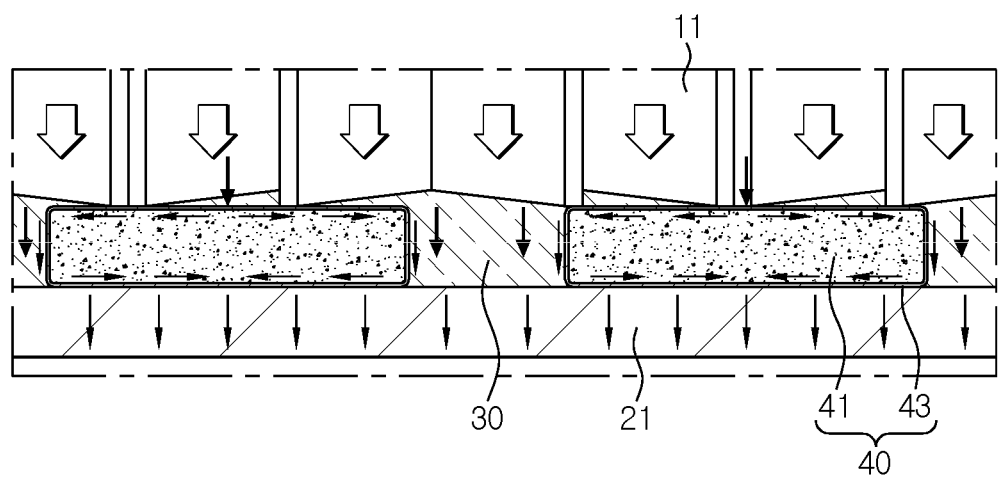
FIG. 7 is a sectional view, taken along the line I-I' of FIG. 5.

In addition, as shown in FIG. 6, a thermal conductive adhesive 30 is additionally applied on the bottom plate 21. At this time, the thermal conductive adhesive 30 may be filled to a location higher than the upper surface of the heat dissipation foam 40. This is to prevent an air layer from forming in the space between the lower end of the cell stack 10 and the bottom plate 21 while subsequently placing cell stacks 10 later and also to stably secure adhesion and thermal conductivity among the edge portion of the secondary battery 11, the heat dissipation foams 40 and the bottom plate 21.

The cell stack 10 is placed on the bottom plate 21 provided with the thermal conductive adhesive 30 and the heat dissipation foam 40 as above. At this time, due to the weight of the cell stack 10, the lower end of the cell stack 10, namely the lower edges of the secondary batteries 11, is placed in contact with the upper surface of the heat dissipation foams 40, and the thermal conductive adhesive 30 spreads in all directions to permeate the spaces between the secondary batteries 11.

In the present disclosure, since the battery module is configured as above, the cell stack 10 may be adhesively fixed to the bottom plate 21. Also, as indicated by the arrow in FIG. 7, the heat generated from each secondary battery 11 may be transferred to the thermal conductive adhesive 30 or the heat dissipation foams 40 at the lower edge of the secondary batteries 11, and the heat of the thermal conductive adhesive 30 and the heat dissipation foams 40 may be emitted through the bottom plate 21 to the heatsink 60 or outside.

At this time, in particular, the heat dissipation sheet 43 made of a graphite material has excellent heat conduction in the surface direction. Therefore, the heat dissipation sheet 43 may be effective in lowering the temperature of the secondary batteries 11 by transferring the heat absorbed from the secondary batteries 11 to the bottom plate 21 in a short time and spreading the heat widely.

In addition, the heat dissipation foams 40 are very light and have compression resilience since their cores are made of the urethane foam 41. Therefore, sufficient adhesion may be secured among the heat dissipation foams 40, the edge portion of the secondary battery 11 and the bottom plate 21, and the heat dissipation foams 40 may function to buffer shocks or vibrations applied from the outside of the battery module to reduce the amount of impact received by the secondary batteries 11.

Meanwhile, the battery module according to this embodiment may further include fence members 50 located inwardly of both longitudinal ends of the bottom plate 21 by a predetermined distance and configured to form walls with a predetermined height from the surface of the bottom plate 21 to confine the thermal conductive adhesive 30 in a predetermined area.

Figure 8:
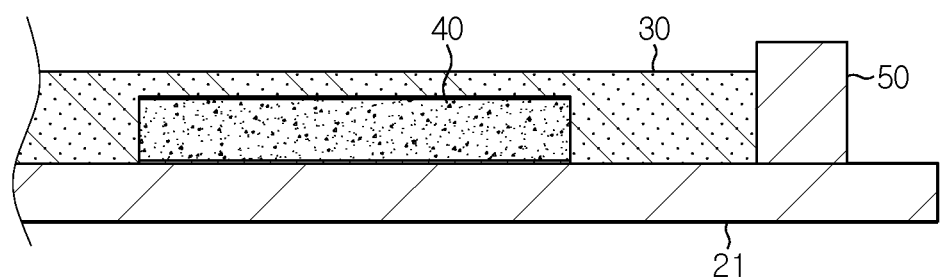
FIG. 8 is an enlarged view showing a region A of FIG. 3.
Figure 9:
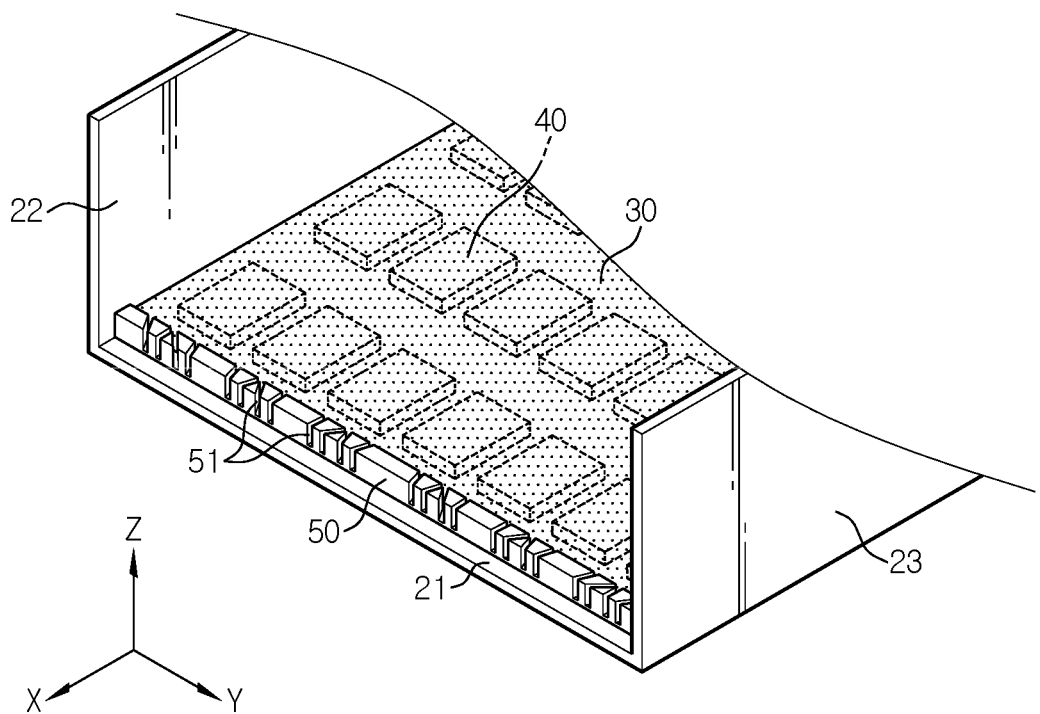
FIG. 9 is a perspective diagram for illustrating a fence member according to an embodiment of the present disclosure.

As shown in FIGS. 2 and 8 to 9, the fence member 50 may be provided to have a length corresponding to the length of the bottom plate 21 along the width direction (±Y axis) and to have a height higher than the thickness of the thermal conductive adhesive 30 applied onto the upper surface of the bottom plate 21.

The fence member 50 may play a role of preventing the thermal conductive adhesive 30 from being lost in the front and rear direction while the cell stack 10 is being placed on the bottom plate 21.

The fence member 50 may be provided in a pad form made of, for example, a shock absorbing memory foam or rubber material to be detachably attached to the upper surface of the bottom plate 21. Therefore, even if a cell body or a cell terrace 11b of the pouch-type secondary battery 11 accidentally hits the fence member 50 while the cell stack 10 is being placed, resultant damage may be minimized. In addition, since the fence member 50 is detachable, the location of the fence member 50 may be adjusted according to the application amount of the thermal conductive adhesive 30 or the size of the pouch-type secondary battery 11.

In addition, the fence member 50 may further have slits 51 so that a part of the cell terrace 11b is vertically inserted therein. In the process of placing the cell stack 10 on the upper surface of the bottom plate 21, the lower ends of the cell terraces 11b of the pouch-type secondary batteries 11 are vertically inserted into the slits 51, so that the lower ends of the cell terraces 11b are prevented from being wrinkled or torn.

Referring to FIG. 3 again, the battery module of the present disclosure may further include a heatsink 60 configured to dissipate the heat accumulated in the bottom plate 21 more quickly.

The heatsink 60 is a component that contacts a heat source and absorbs heat therefrom, and may be implemented in the form of a plate-shaped body provided to allow a coolant 62 to flow therein and disposed in contact with the lower surface of the bottom plate 21.

The coolant 62 flowing in the flow path is not particularly limited as long as it may easily flow through the flow path and is excellent in cooling ability. For example, the coolant may be water that may maximize cooling efficiency due to a high latent heat. However, the coolant may employ an antifreeze, a gas refrigerant, air, or the like, which may flow, without being limited to the above.

The heatsink 60 may be made of aluminum or aluminum alloy having high thermal conductivity, without being limited thereto. For example, the heatsink 300 may be made of copper, gold or silver. In addition, the heatsink 300 may be made of a ceramic material such as aluminum nitride and silicon carbide, other than metals.

As described above, according to the present disclosure, it is possible to fix the cell stack 10 to the bottom surface of the module housing 20 and transfer the heat of the cell stack 10 effectively. In addition, it is possible to reduce the amount of the thermal conductive adhesive 30 as much as the volume of the heat dissipation foams 40. Therefore, the battery module may have a light weight compared to conventional battery modules of a similar concept.

Figure 10:
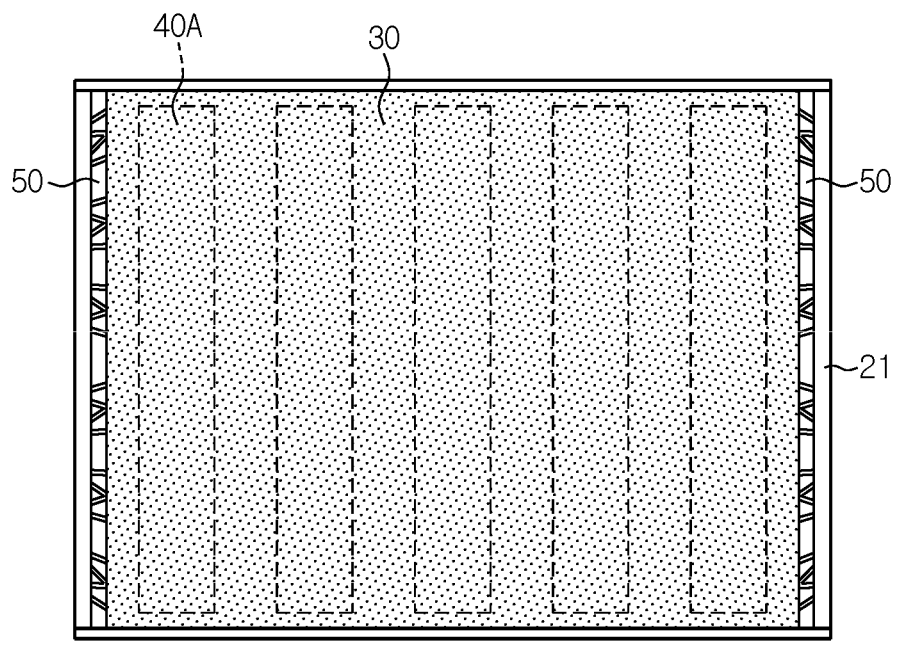
FIG. 10 is a plan view diagram corresponding to FIG. 6 for illustrating another embodiment the present disclosure.

FIG. 10 is a diagram corresponding to FIG. 6 for illustrating another embodiment the present disclosure.

Another embodiment of the present disclosure will be briefly described with reference to this drawing.

The same reference signs as in the former drawings denote the same members. Also, the same members will not be described in detail, and features different from the former embodiment will be described in detail.

In the battery module according to another embodiment of the present disclosure, the heat dissipation foams 40A may have a length extending as much as a length of a lateral width of the bottom plate 21 and be spaced apart from each other by a predetermined interval from each other in the front and rear direction of the bottom plate 21.

According to the configuration of this embodiment, since the heat dissipation foam 40A and the bottom plate 21 are contacted more broadly to spread the heat more widely, the temperature of the secondary batteries 11 may be lowered more quickly. In addition, since the length of the heat dissipation foam 40A is extended as much as the length of the lateral width of the bottom plate 21, the lower edges of all pouch-type secondary batteries 11 are supported in contact with the upper surface of the heat dissipation foam 40A, so the cell stack 10 may be supported and buffered by the heat dissipation foam 40A more stably.

Meanwhile, a battery pack according to the present disclosure may include at least one of the battery modules of the present disclosure. In addition to the battery module, the battery pack according to the present disclosure may further include a pack case for accommodating the battery module, and various devices for controlling charge and discharge of the battery module such as a battery management system (BMS), a current sensor, a fuse or the like.

The battery module according to the present disclosure may be applied to a vehicle such as an electric vehicle or a hybrid electric vehicle. That is, the vehicle according to the present disclosure may include the battery module according to the present disclosure. In particular, if the vehicle receives a driving power from a battery like an electric vehicle, the cooling performance of the battery module is very important. Therefore, if the battery module according to the present disclosure is applied to the vehicle, a stable and safe battery module may be provided due to effective cooling performance.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or an object to be observed.

What is claimed is:

1. A battery module, comprising:
   a cell stack having a plurality of secondary batteries stacked along a stacking direction;
   a module housing configured to accommodate the cell stack therein;
   a thermal conductive adhesive provided in a heat transfer space defined between a first outer surface of the cell stack and a first inner surface of the module housing adjacent to the first outer surface of the cell stack; and
   a plurality of heat dissipation foam portions, each of the plurality of heat dissipation foam portions having a foam structure with a predetermined volume and a heat dissipation sheet configured to surround the foam structure, the plurality of heat dissipation foam portions being disposed in the heat transfer space and spaced apart from one another so as to define open regions therebetween,
   wherein the thermal conductive adhesive fills the open regions between the plurality of heat dissipation foam portions and between the first outer surface of the cell stack and an upper surface of the plurality of heat dissipation foam portions that faces the first outer surface of the cell stack.

2. The battery module according to claim 1,
wherein the heat dissipation sheet is made of a graphite material.

3. The battery module according to claim 1,
wherein the module housing includes:
a first plate made of a thermal conductive material and configured to form the first inner surface of the module housing;
a pair of side plates extending transverse to the first plate and configured to cover opposing third and fourth outer surfaces of the cell stack; and
a second plate configured to cover a second outer surface of the cell stack opposite to the first outer surface.

4. The battery module according to claim 3,
wherein the plurality of heat dissipation foam portions each have an upper surface spaced away from the first inner surface of the module housing, and wherein the thermal conductive adhesive fills the heat transfer space to at least a height above the inner surface farther than the upper surface of the plurality of heat dissipation foam portions.

5. The battery module according to claim 3,
wherein the plurality of heat dissipation foam portions each have a hexahedral shape or a roll shape, and wherein the plurality of the heat dissipation foam portions are arranged in a matrix on the first plate with a predetermined interval from each other.

6. The battery module according to claim 3,
wherein the plurality of heat dissipation foam portions each have a length extending as much as a width of the first plate defined between the pair of side plates, and wherein the plurality of the heat dissipation foam portions are arranged along the first plate with a predetermined interval between one another along a length dimension orthogonal to the width of the first plate.

7. The battery module according to claim 3,
wherein the plurality of heat dissipation foam portions are disposed so that a lower surface thereof is in contact with the first inner surface of the bottom plate and so that an upper surface of each of the plurality of heat dissipation foam portions is spaced away from the first inner surface of the bottom plate, the upper surface being opposed to the lower surface, and
the cell stack is disposed so that at least a part of the first outer surface thereof is in contact with the respective upper surfaces of the heat dissipation foam portions so as to perform heat transfer and buffering.

8. The battery module according to claim 3, wherein the first plate has opposing longitudinal ends extending transverse to the pair of side plates, the battery module further comprising:
fence members located inwardly of both opposing longitudinal ends of the first plate by a predetermined distance and configured to form walls with a predetermined height above the inner surface of the first plate so as to confine the thermal conductive adhesive in a predetermined area.

9. The battery module according to claim 3, wherein the first plate has a first outer surface opposite to the first inner surface, the battery module further comprising:
a heatsink disposed in contact with the outer surface of the first plate to absorb heat of the first plate.

10. The battery module according to claim 1,
wherein the plurality of heat dissipation foam portions are each made of a polyurethane material.

11. The battery module according to claim 1,
wherein the secondary batteries are stacked to be in close contact with each other in the stacking direction, such that collective edges of the secondary batteries along the stacking direction define the first outer surface of the cell stack.

12. The battery module according to claim 1,
wherein the secondary batteries are pouch-type secondary batteries or rectangular secondary batteries.

13. A battery pack, comprising the battery module according to claim 1.

14. A vehicle, comprising the battery module according to claim 1.

15. The battery module according to claim 1, wherein the plurality of heat dissipation foam portions are each made of a material that is elastically compressible.

16. The battery module according to claim 1, wherein the thermal conductive adhesive is spreadable.

17. The battery module according to claim 1, wherein the thermal conductive adhesive is a thermal conductive resin.

\* \* \* \* \*